US011221312B2

United States Patent
Amos et al.

(10) Patent No.: US 11,221,312 B2
(45) Date of Patent: Jan. 11, 2022

(54) ADHESIVE BOND TEST RESONANCE ARRAY

(71) Applicant: Textron Aviations Inc., Wichita, KS (US)

(72) Inventors: Jay M. Amos, Wichita, KS (US); Bharath Kumar Kodumuru, Bangalore (IN)

(73) Assignee: Textron Innovations, Inc., Providence, RI (US)

( * ) Notice: Subject to any disclaimer, the term of this patent is extended or adjusted under 35 U.S.C. 154(b) by 292 days.

(21) Appl. No.: 16/508,690

(22) Filed: Jul. 11, 2019

(65) Prior Publication Data
US 2020/0018728 A1  Jan. 16, 2020

Related U.S. Application Data

(60) Provisional application No. 62/696,534, filed on Jul. 11, 2018.

(51) Int. Cl.
*G01N 29/22* (2006.01)
*G01N 29/28* (2006.01)
*G01N 29/12* (2006.01)

(52) U.S. Cl.
CPC .......... *G01N 29/12* (2013.01); *G01N 29/225* (2013.01); *G01N 29/28* (2013.01); *G01N 2291/0231* (2013.01); *G01N 2291/106* (2013.01); *G01N 2291/267* (2013.01)

(58) Field of Classification Search
CPC .... G01N 29/28; G01N 29/265; G01N 29/225; G01N 29/12; G01N 2291/106; G01N 2291/267; G01N 2291/0231; G01N 2291/2638

USPC .......................................................... 73/582
See application file for complete search history.

(56) References Cited

U.S. PATENT DOCUMENTS

| 4,944,185 | A * | 7/1990 | Clark, Jr. ............... G01N 29/12 324/214 |
| 6,874,365 | B2 | 4/2005 | Deveney et al. |
| 7,270,004 | B2 | 9/2007 | Dickinson et al. |
| 7,430,913 | B2 * | 10/2008 | Sarr ...................... G01N 29/225 73/618 |
| 7,444,876 | B2 * | 11/2008 | Sarr ...................... G01N 29/226 73/618 |
| 7,617,732 | B2 * | 11/2009 | Bui ...................... G01N 29/043 73/618 |

(Continued)

FOREIGN PATENT DOCUMENTS

GB         2194051 A  *  2/1988   ......... G01N 29/0645

Primary Examiner — Jacques M Saint Surin
(74) Attorney, Agent, or Firm — Erise IP, P.A.

(57) ABSTRACT

An adhesive bond test resonance array provides inspection of adhesively bonded composite laminate structures with improved productivity and higher reliability. A holder has multiple slots arranged in a two-dimensional array for holding transducers in respective slots. The holder is adapted to position a probe end of each of the transducers adjacent a component for scanning and has a material hardness adapted for enabling flexing while scanning curved composite parts. A fluid channel is adapted for delivering a couplant to the probe end of the transducers such that the couplant is automatically delivered during scanning of the component to inspect bond integrity.

20 Claims, 8 Drawing Sheets

(56) References Cited

U.S. PATENT DOCUMENTS

| | | | |
|---|---|---|---|
| 7,698,947 B2* | 4/2010 | Sarr | G01N 29/225 |
| | | | 73/618 |
| 8,087,298 B1* | 1/2012 | DiMambro | G01N 29/226 |
| | | | 73/629 |
| 9,494,562 B2 | 11/2016 | Lin et al. | |
| 9,945,817 B2* | 4/2018 | Pember | G01N 29/0609 |
| 10,953,608 B2* | 3/2021 | Jahanbin | B29C 66/112 |
| 2009/0165563 A1* | 7/2009 | McGrath | G01N 29/225 |
| | | | 73/644 |
| 2011/0118991 A1 | 5/2011 | Lepage et al. | |
| 2014/0020467 A1 | 1/2014 | Singh et al. | |
| 2015/0233869 A1* | 8/2015 | Barrett | G01N 29/24 |
| | | | 376/249 |
| 2018/0231502 A1* | 8/2018 | Kahmann | G01N 29/225 |

* cited by examiner

ADHESIVE BOND TEST RESONANCE ARRAY

CROSS-REFERENCE TO RELATED APPLICATIONS

This application claims the benefit of U.S. Provisional Application No. 62/696,534 entitled "Adhesive Bond Test Resonance Array" and filed on Jul. 11, 2018, which is herein incorporated by reference in its entirety.

BACKGROUND

1. Field

Embodiments of this disclosure relate generally to non-destructive inspection of components formed from adhesively bonded metal or composite materials and more specifically to a holder adapted for holding an array of probes for scanning components using an acoustic resonance mode.

2. Description of the Related Art

Many different types of nondestructive testing of bonded materials have been described in the prior art. For example, U.S. Pat. No. 6,874,365 to Deveney et al. discloses an ultrasound inspection method that uses higher frequency longitudinal ultrasonic waves for correlating residual strength of composite bonds with a reflected amplitude; U.S. Pat. No. 7,270,004 to Dickinson et al. discloses nondestructive testing of materials with a conventional pitch/catch probe used at particular frequency-bands to avoid frequency resonances of the probe; U.S. Patent Publication 2011/0118991 to Lepage et al. discloses a multi-frequency bond testing system that uses a single element probe to generate a C-scan of amplitude and/or phase; U.S. Patent Publication 2014/0020467 to Singh et al. discloses non-destructive evaluation methods for machine-riveted bearings that includes a plurality of acoustic sensors; and, U.S. Pat. No. 9,494,562 to Lin et al. discloses non-destructive testing using three or more transducers each configured as a transmitter or receiver for sonic or ultrasonic chirp waves in order to reduce overlap of scanned portions of the composite structure.

SUMMARY

In an embodiment, an adhesive bond test resonance array includes a holder that has multiple slots arranged in a two-dimensional array. Multiple transducers are placed in respective slots. The holder is adapted to position a probe end of each of the transducers adjacent a component for scanning. A fluid channel is adapted for delivering a couplant to the probe end of the transducers such that the couplant is automatically delivered during scanning of the component.

In another embodiment, a transducer holder is provided for holding an array of transducers for scanning bonds of composite parts. The transducer holder includes an array of slots adapted for holding the array of transducers. A spring is inserted into each slot for providing a compressive force to each of the transducers. A removable plate is provided for supporting the array of transducers and their springs in the respective array of slots. The transducer holder has a material hardness adapted for enabling flexing of the transducer holder while scanning curved composite parts.

BRIEF DESCRIPTION OF THE DRAWINGS

Illustrative embodiments of the present disclosure are described in detail below with reference to the attached drawing figures, which are incorporated by reference herein and wherein.

Figure 1:
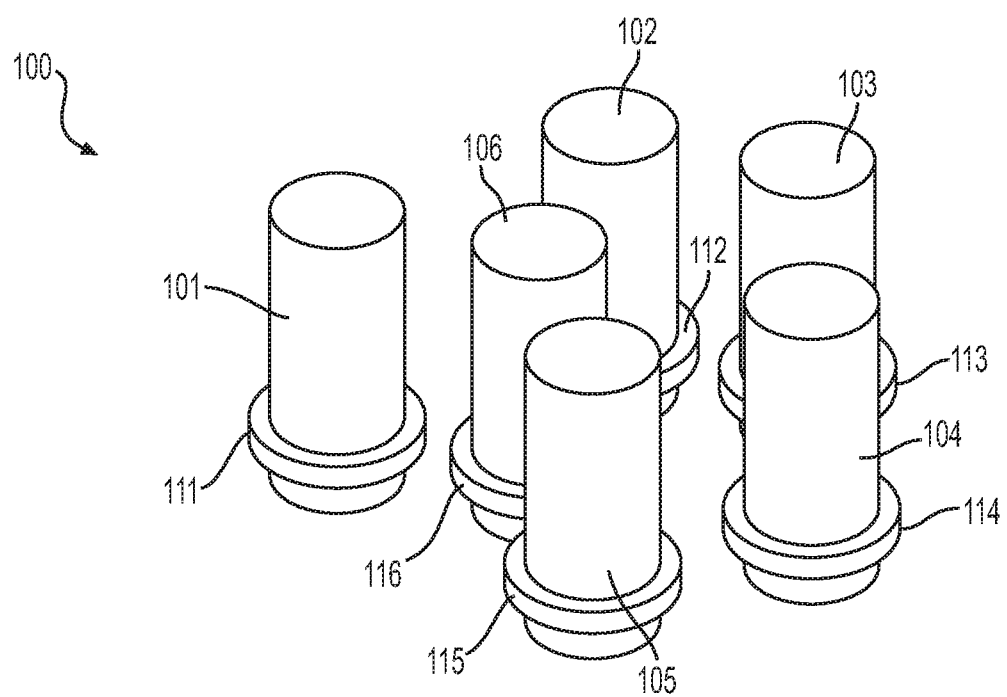
FIG. 1 is a perspective view of an adhesive bond test transducer array, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

Non-destructive testing techniques are important for quality control and inspection of components, such as adhesively bonded composite laminate structures. One example of a non-invasive testing technique is ultrasonic acoustic testing which is based on the propagation of ultrasonic waves in the component being tested. Another example is acoustic resonance testing, which uses special narrow bandwidth transducers to produce resonant frequency waves for inspecting a material. A disbond or bond defect in a bonded multilayer metallic or composite laminate alters the acoustic impedance, which changes the electrical impedance phase and amplitude from a null reference condition. In multi-layered structures, the phase is related to a depth of the defect, which is a useful aspect of resonance testing that is important for ensuring structural soundness and facilitating repair.

Existing acoustic resonance testing systems and methods are slow, tedious, and subject to defect misses and degraded inspection reliability. To obtain useful acoustic resonance test results, appropriate pressure and contact of a transducer should be applied in a direction substantially normal to the component surface, which is sometimes difficult to achieve, especially for curved or contoured components. Providing imaging data based on acoustic resonance testing remains challenging even for scanning with a single probe with multi-axis encoding while maintaining surface normality on component contours.

Embodiments of the present disclosure provide a system and method to inspect adhesively-bonded components with improved productivity and higher reliability (e.g., less probability of missed defects). A plurality of transducers are arranged in an array within a flexible holder. The holder is adapted to position the array of transducers for accurately scanning contoured parts. An integrated couplant delivery subsystem automatically delivers couplant between each of the transducers and the component under inspection. A couplant is for example a gel that facilitates transmission of acoustic energy from the transducer into the test component.

Imaging data based on the transducer scanning are provided to aid positional interpretation and defect characterization. Additionally, the image data provide a record of the testing result for inspection reliability and for warranty and field service investigations.

FIG. 1 is a perspective view of an exemplary adhesive bond test transducer array 100. In certain embodiments, transducer array 100 includes six transducers, namely a first, a second, a third, a fourth, a fifth, and a sixth transducer 101, 102, 103, 104, 105, and 106. However, array 100 may include greater than six or fewer than six transducers without departing from the scope hereof. Transducers 101-106 are for example narrow bandwidth piezoelectric transducers, typically operating between about 20-kHz to about 350-kHz. In certain embodiments, an acoustic resonance mode is selected with a predetermined time-constant and a narrow-band excitation. The same transducers are used for excitation and receiving the reflected signal. Transducers 101-106 may be arranged in a particular pattern for use in an adhesive bond test resonance method. An exemplary transducer arrangement is best viewed in FIG. 2.

Figure 2:
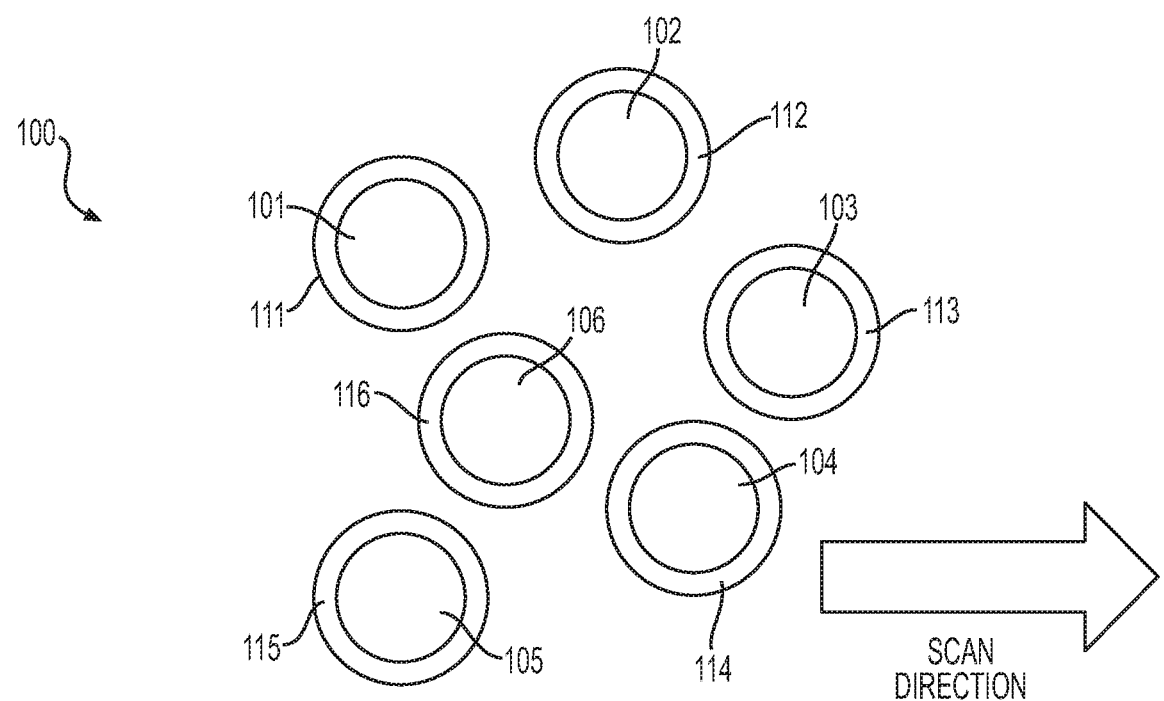
FIG. 2 is a top view of the transducer array of FIG. 1.
Figure 3:
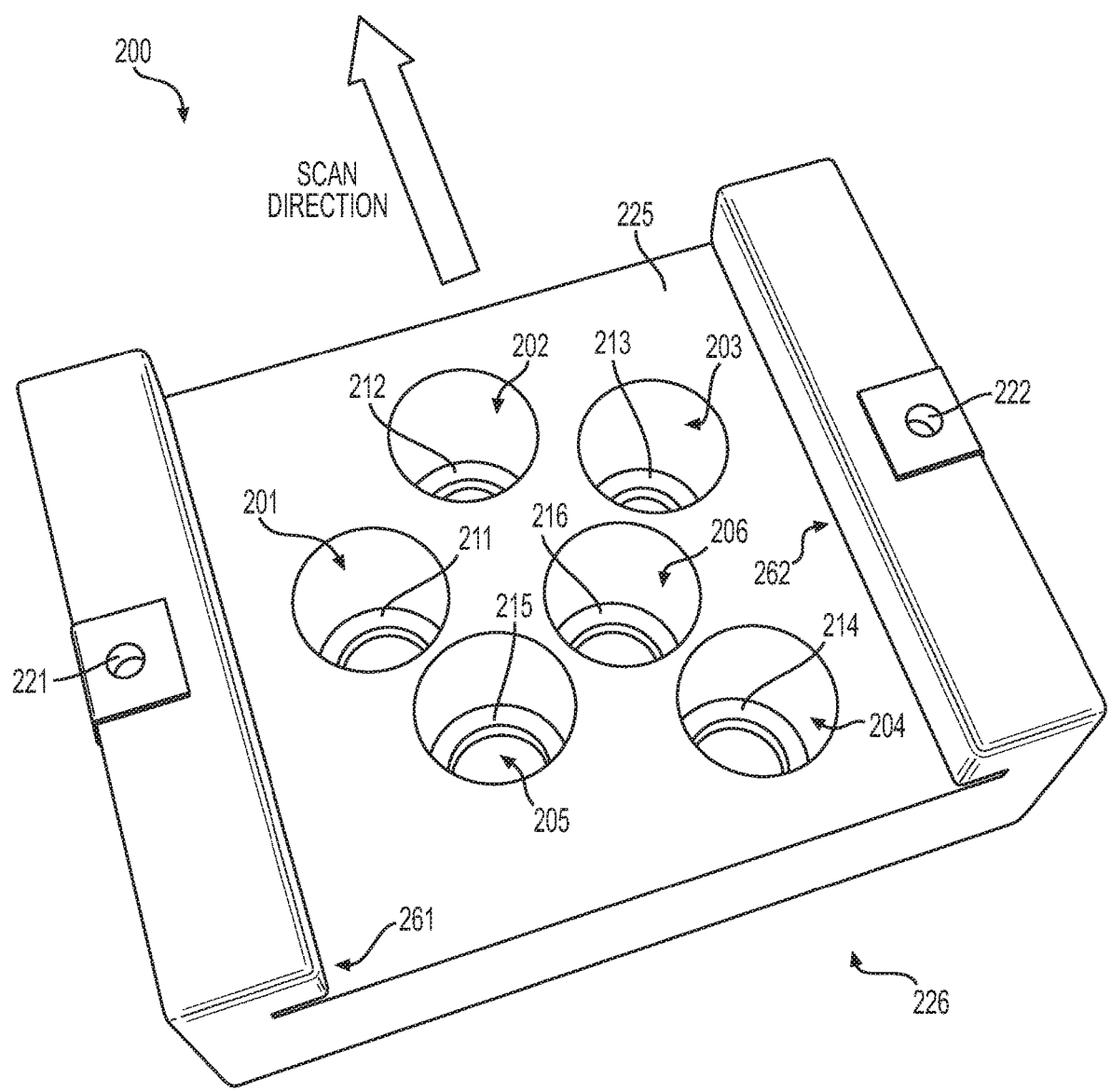
FIG. 3 is a perspective view of one embodiment of a holder adapted for holding transducers of an adhesive bond test transducer array, in an embodiment.

FIG. 2 is a top view of transducer array 100, FIG. 1. Transducer array 100 is arranged in a predetermined two-dimensional pattern. In certain embodiments, the two-dimensional pattern is a misaligned matrix where the columns and rows are arranged in substantially unstraight lines. The pattern is adapted to provide a desired index overlap that ensures sensitivity coverage during scanning. A scan direction is depicted in FIGS. 2 and 3 to indicate a preferred direction of use during scanning. In embodiments having a six-element array, as depicted herein, transducers 101-106 may be arranged in two misaligned columns and three misaligned rows, with the misaligned columns and rows being curved, slightly off-axis, or substantially unstraight to accommodate adequate physical support from the holder. Arranging the transducer positions in an irregular pattern, such as that shown in FIGS. 1-3, helps to reduce an overall array footprint, which enables scanning closer to part edges or geometrical features.

FIG. 3 is a perspective view of an exemplary holder 200 adapted for holding transducers used in an adhesive bond test resonance array. In the embodiment depicted in FIG. 3, holder 200 includes six slots, namely a first, a second, a third, a fourth, a fifth, and a sixth slot 201, 202, 203, 204, 205, and 206. Slots 201-206 are configured to receive a respective one of transducers 101-106 of FIG. 1. Each of slots 201-206 includes a respective one of inner rings 211-216 adapted for mating with one of collars of 111-116. Transducers 101-106 are inserted into slots 201-206 such that inner rings 211-216 retain transducers 101-106 in slots 201-206 via collars 111-116. In certain embodiments, each of transducers 101-106 has an outer diameter of 0.412-inch and each of collars of 111-116 has outer diameter of 0.550-inch.

As depicted in FIG. 3, a receiving side 225 of holder 200 is in view, while an interface side 226, opposite the receiving side, is obscured from view. Receiving side 225 is adapted to receive transducers 101-106 within slots 201-206 such that a probe end of each of transducers 101-106 extends through a respective one of inner rings 211-216 and protrudes out of the interface side 226.

Figure 4:
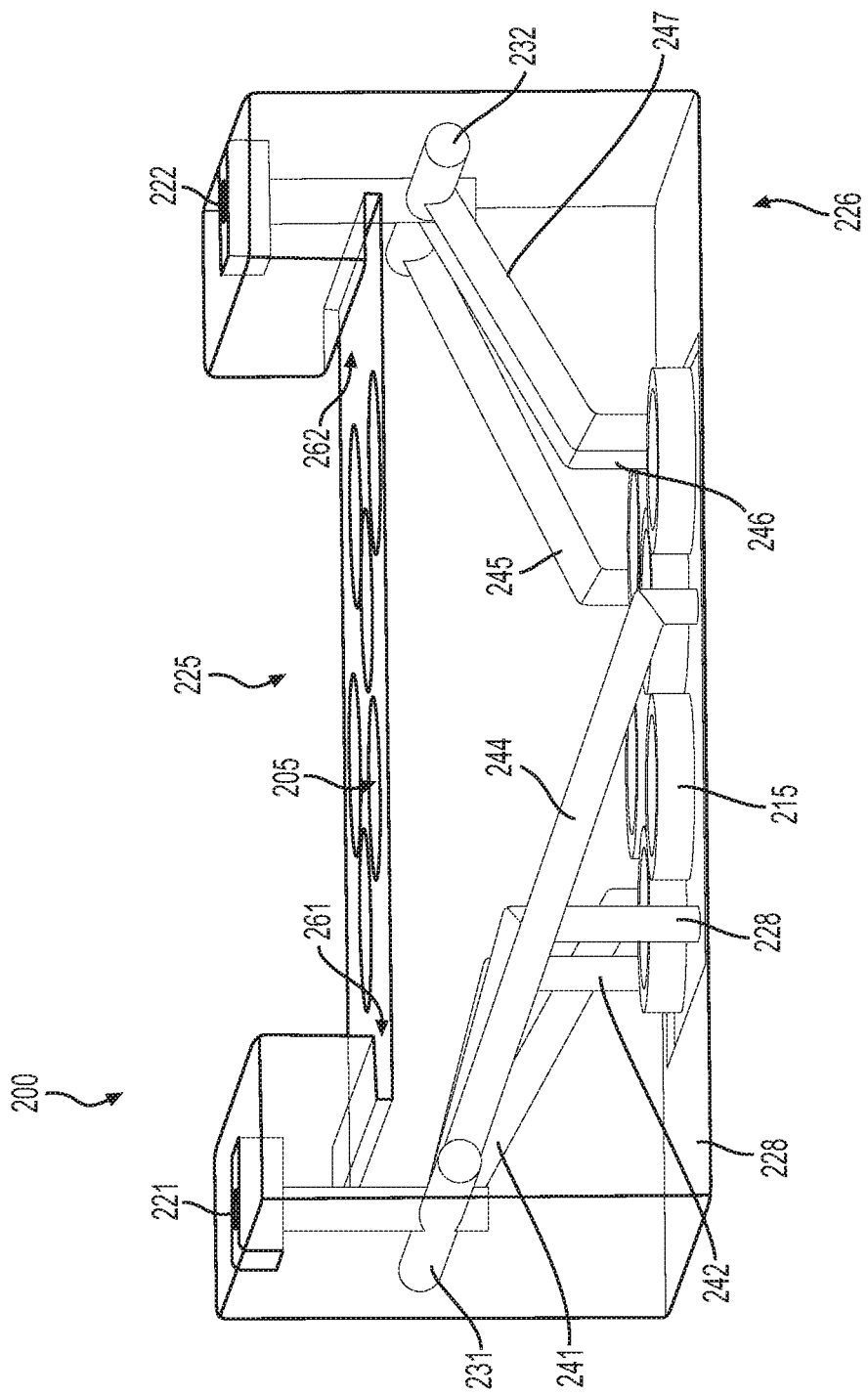
FIG. 4 is a transparent side view of the holder of FIG. 3.
Figure 5:
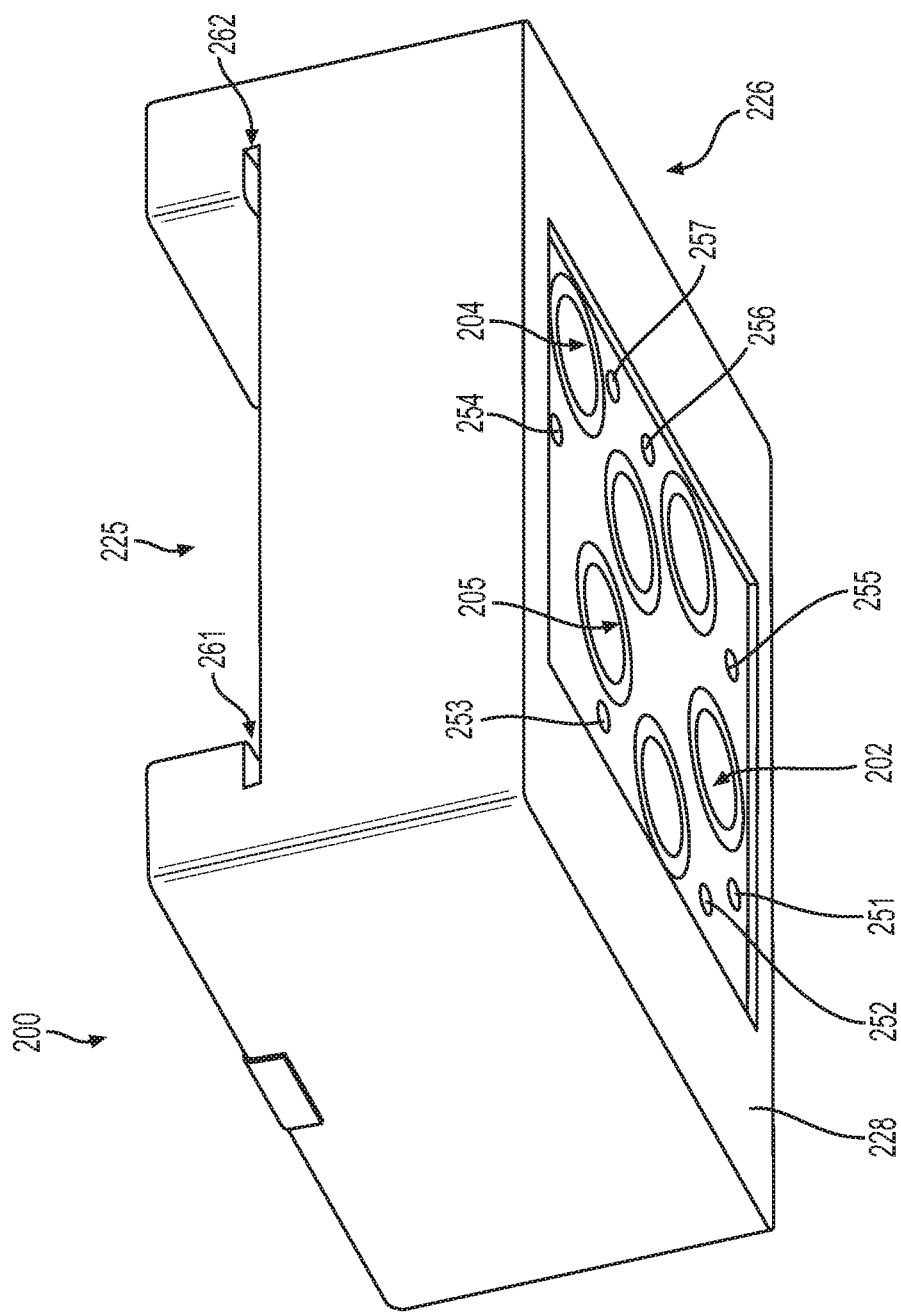
FIG. 5 is a rotated perspective view of the holder of FIG. 3.

To hold transducers 101-106 in their respective holes 201-206, a removable plate (not shown) may be installed in holder 200 by sliding the plate within a first notch 261 and a second notch 262 along receiving side 225 (see also FIGS. 4 and 5). In certain embodiments, the removable plate is made of a material that is more rigid compared to a main body of holder 200 such that transducers 101-106 are secured in their respective holes 201-206 when the removeable plate is installed within notches 261, 262 while simultaneously allowing holder 200 to flex with contours of the component under inspection.

In certain embodiments, a spring (not shown) is disposed within each of slots 201-206 following insertion of transducers 101-106 and prior to installation of the removable plate. For example, the spring is a cylindrically-shaped compression spring (e.g., a helical coil spring) with an inner diameter large enough to accommodate one of transducers 101-106 and an outer diameter small enough to fit inside one of holes 201-206. However, a wave-type or cantilever-type spring may be used as an alternative. The spring is disposed concentrically around one of transducers 101-106 and abuts a respective one of collars 111-116 and the removable plate. The springs enable longitudinal displacement of transducers. For example, as a force is applied against a probe end of each transducer (e.g., as the transducer is pressed against a component being inspected), the respective spring is compressed accordingly such that the transducer is pushed at least partially into its respective slot. As the force is removed, the spring extends returning the transducer to a fully extended position. In some embodiments, the spring rate provides a contact load of between about 2 to about 18 ounces on the transducer to provide adequate pressure for reliable ultrasonic coupling and interrogation in a resonance mode. Too much spring force causes probe drag and skipping while scanning. Too little spring force causes inadequate coupling of the ultrasonic energy into the component under inspection.

FIG. 4 is a transparent side view of holder 200, FIG. 3 for revealing internal components. Specifically, FIG. 4 depicts internal irrigation channels that are adapted to automatically deliver a couplant uniformly to the inspection side of the array of transducer probes while components are being inspected. The couplant may be any water-based, oil-based, or glycerin-based gel or liquid (e.g., water thickened with propylene glycol). By automatically delivering couplant via holder 200, large surface areas may be scanned more easily and rapidly. The couplant may be inserted into a first inlet 221 and a second inlet 222. First and second inlets 221, 222 may be made of a material having a higher material hardness compared to holder 200 for retaining fittings that fluidly couple the inlets 221, 222 to tubing for the couplant.

First and second 221, 222 inlets are each fluidly coupled to a first manifold 231 and a second manifold 232, respectively. The manifolds 231, 232 each distribute fluid to a plurality of channels that open to the interface side of holder 200. In the embodiment depicted in FIG. 4, first manifold 231 distributes fluid to four channels: a first channel 241, a second channel 242, a third channel 243, and a fourth channel 244, while second manifold 232 distributes fluid to a fifth channel 245, a sixth channel 246, and a seventh channel 247. In FIG. 4, slots 201-206 through holder 200 connecting the inner rings with the slot openings are not depicted for clarity of illustration (e.g., the opening to slot 205 connects with inner ring 215).

In certain embodiments, a plate 228 is fixed to the interface side 226 of holder 200 (see also FIG. 5). Plate 228 provides a thin hard face on the interface side 226 to protect the holder 200 from wear during scanning across part surfaces.

FIG. 5 is a perspective view of holder 200 rotated to show the interface side 226. An outlet of each fluid channel is viewable in FIG. 5. For example, first channel 241 fluidly couples to a first outlet 251, second channel 242 fluidly couples to a second outlet 252, and so on for third through seventh channels 243-247 fluidly coupled to third through seventh outlets 253-257, respectively. The number and location of the inlets, outlets, manifolds, and channels may be varied without departing from the scope hereof.

In certain embodiments, holder 200 is constructed of a flexible material having a hardness within a specific range (e.g., a Shore A of about twenty to about sixty). The material hardness is such that individual transducers 101-106 are closely spaced while also maintaining flexing capability for scanning curved components. Close spacing of transducers 101-106 is needed for inspecting along part edges and other geometrical features. Additionally, holder 200 has sufficient hardness to mechanically retain spring-loaded transducers over the life of the probe. Inner rings 211-216 are formed of a hard-plastic material (e.g., having a material hardness level that is higher than that of the holder 200) to retain the transducers against spring pressure.

In certain embodiments, holder 200 has a coverage index of about 1.60-inches compared to a coverage index of only about 0.19-inch with previous single element manual methods, providing an 8.4-fold productivity improvement. A single transducer coverage index varies depending on the resonance frequency band optimal for a given bond assembly configuration, which influences the transducer size.

Figure 6:
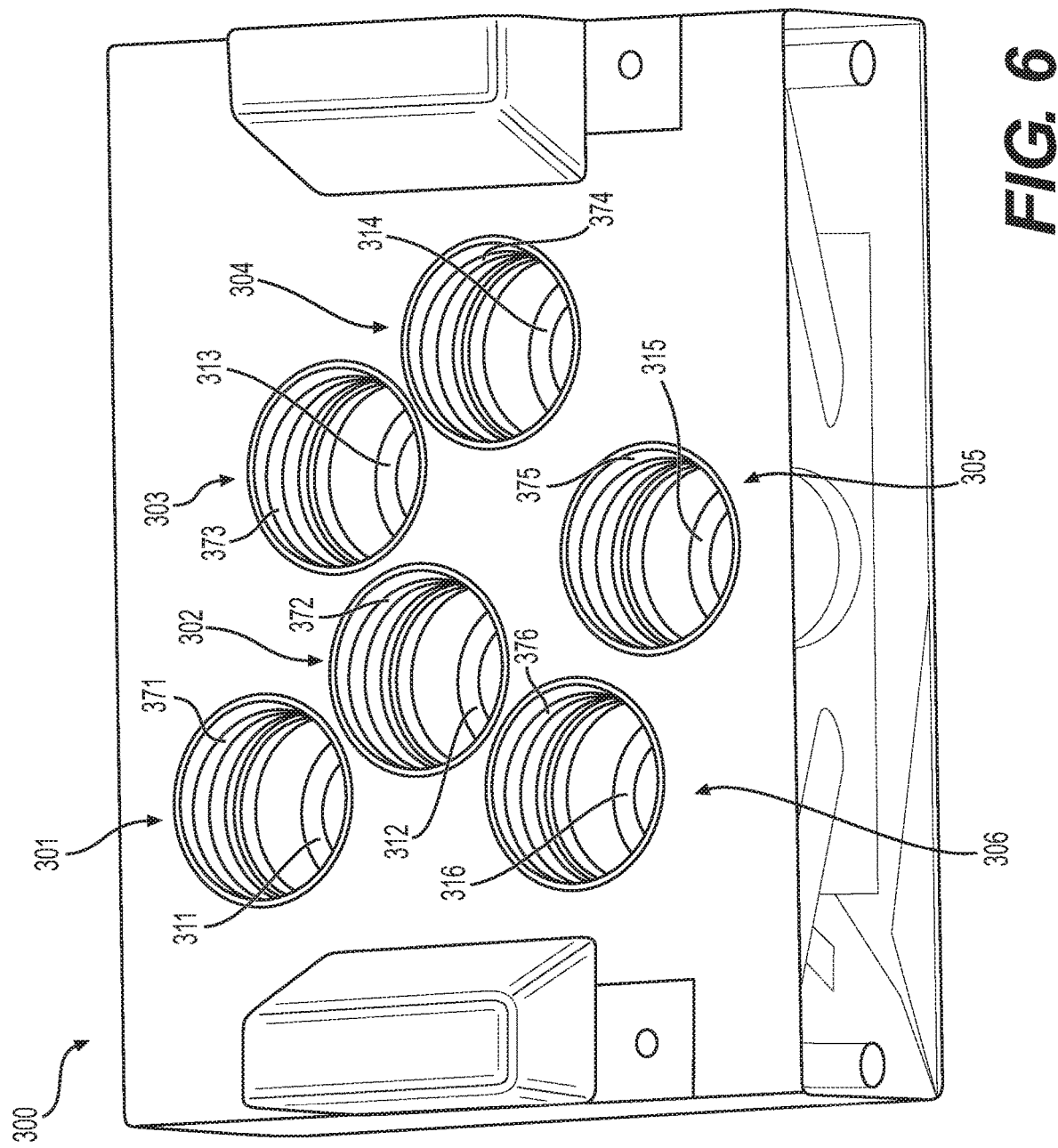
FIG. 6 is a perspective view of a holder adapted for holding transducers used in an adhesive bond test resonance array, in an embodiment.
Figure 7:
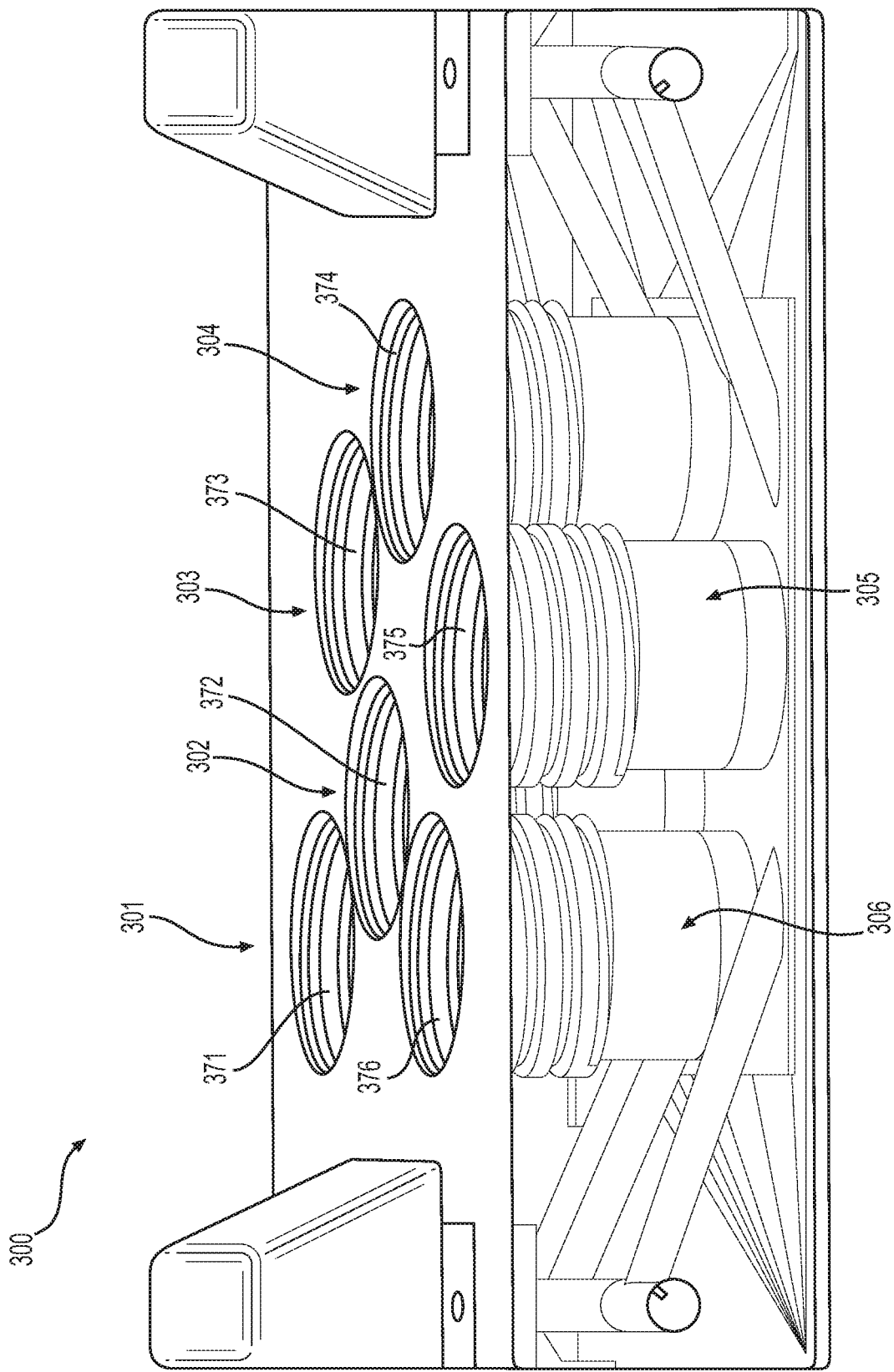
FIG. 7 is a transparent side view of the holder of FIG. 6.

FIG. 6 is a perspective view of an exemplary holder 300 adapted for holding transducers used in an adhesive bond test resonance array. FIG. 7 is a transparent side view of holder 300, FIG. 6 for revealing internal components. FIGS. 6 and 7 are best viewed together with the following description.

Similar to holder 200 of FIG. 3, holder 300 includes six slots, namely a first, a second, a third, a fourth, a fifth, and a sixth slot 301, 302, 303, 304, 305, and 306. Slots 301-306 are configured to receive a respective one of transducers 101-106 of FIG. 1. Each of slots 301-306 includes a respective one of inner rings 311-316 adapted for mating with one of collars of 111-116 for retaining transducers 101-106.

Figure 8:
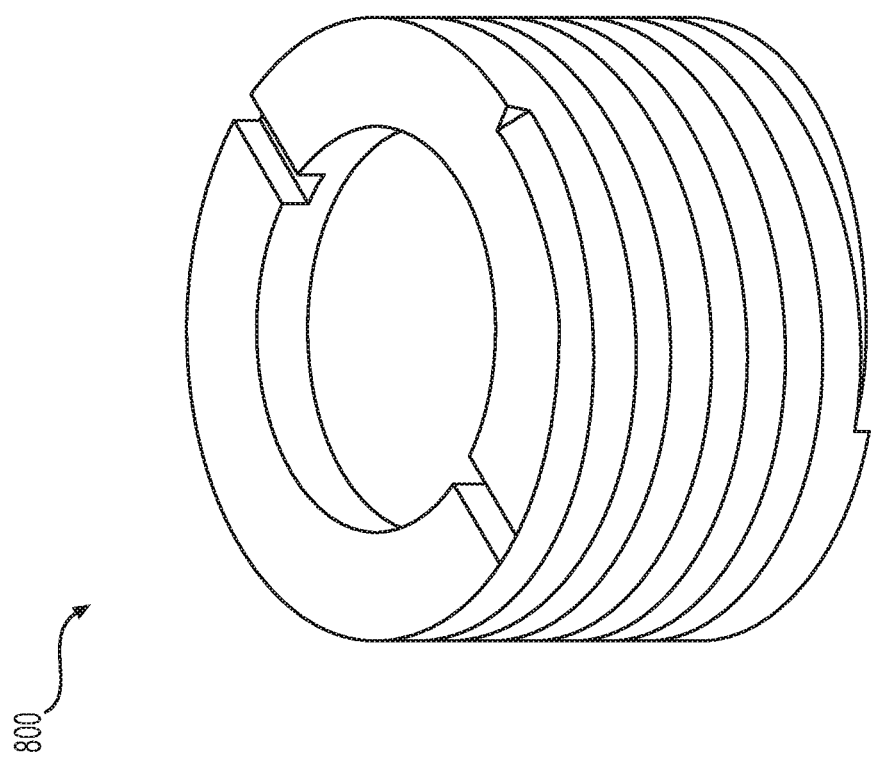
FIG. 8 is a perspective view of a bushing used in the holder of FIG. 6, in an embodiment.

Each of slots 301-306 includes an internal threading adapted to receive a spiral bushing 800 of FIG. 8. For example, slot 301 includes threading 371, slot 302 includes threading 372, slot 303 includes threading 373, slot 304 includes threading 374, slot 305 includes threading 375, and slot 306 includes threading 376. Bushing 800 is used to retain a spring in each of slots 301-306. Similar to holder 200, each spring is adapted to provide a compressive force on a respective transducer. However, in contrast to holder 200, holder 300 uses bushings 800 in place of a removable plate for retaining a spring in each of slots 301-306. Depending on the stiffness of the removable plate needed to retain the springs, the removable plate may inhibit the flexibility of the holder, whereas the bushings 800 retain the springs without inhibiting flexibility of holder 300 since spring retention and holder flexibility are independent.

Advantages provided by embodiments of the present disclosure include a flexible plastic holder that enables multiple transducers to maintain contact with, and conform to, contoured parts while scanning; a hard façade reduces wear of the flexible plastic holder; hard plastic inner rings retain the transducers against spring pressure; and, a (removable) retention plate retains the spring-loaded transducers while maintain flexibility of the holder. Manufacturing of the holder via additive manufacturing techniques (e.g., 3D-printing) enables complex fluid channels that are otherwise challenging and costly to manufacture compared to subtractive manufacturing techniques (e.g., via machining).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. An adhesive bond test resonance array, comprising:
   a holder having a plurality of slots arranged in a two-dimensional array;
   a plurality of transducers each disposed in the plurality of slots, respectively, the holder being adapted to position a probe end of each of the plurality of transducers adjacent a component for scanning; and
   a plurality of springs disposed inside each of the plurality of slots, respectively, wherein each of the plurality of springs provides a compressive force that maintains a contact load between the probe end of each of the plurality of transducers and the component.

2. The adhesive bond test resonance array of claim 1, wherein the two-dimensional array comprises an irregular pattern to reduce an overall footprint of the array, the irregular pattern being compact for scanning close to component edges and irregular geometrical features.

3. The adhesive bond test resonance array of claim 1, wherein the holder has a material hardness adapted for enabling flexing of the holder while scanning a curved component such that each of the plurality of transducers maintains contact with contours of the curved component.

4. An adhesive bond test resonance array, comprising:
   a holder having a plurality of slots arranged in a two-dimensional array;
   a plurality of transducers each disposed in the plurality of slots, respectively, the holder being adapted to position a probe end of each of the plurality of transducers adjacent a component for scanning;
   a fluid channel adapted for delivering a couplant to the probe end of the plurality of transducers such that the couplant is automatically delivered during scanning of the component;
   a receiving side adapted for receiving the plurality of transducers into the respective plurality of slots;
   an interface side, opposite the receiving side, adapted for interfacing with a component under inspection; and
   wherein each of the plurality of transducers has a collar, and each of the plurality of slots has an inner ring adapted for mating with a respective collar such that a probe end of each of the plurality of transducers extends through a respective inner ring and protrudes out of the interface side of the holder.

5. The adhesive bond test resonance array of claim 4, further comprising a plurality of springs disposed inside each of the plurality of slots concentrically around the plurality of transducers adjacent the collar, respectively, wherein each of the plurality of springs provides a compressive force that maintains a contact load between the probe end of each of the plurality of transducers and a component being inspected.

6. The adhesive bond test resonance array of claim 5, wherein the compressive force from each of the plurality of springs provides a contact load of between about 2 to about 18 ounces on a respective one of the plurality of transducers.

7. The adhesive bond test resonance array of claim 5, further comprising a removable plate adapted for retaining the plurality of springs in the respective plurality of slots, the holder having a pair of opposing notches along the receiving side for accepting the removable plate.

8. The adhesive bond test resonance array of claim 5, the plurality of slots each comprising an internal threading adapted to receive a bushing for retaining each of the plurality of springs.

9. The adhesive bond test resonance array of claim 1, the fluid channel further comprising:
   an inlet located on a receiving side of the holder for receiving a couplant;
   a plurality of outlets located on an interface side of the holder; and
   a manifold fluidly coupling the inlet to the plurality of outlets such that the couplant is delivered to a plurality of locations.

10. The adhesive bond test resonance array of claim 1, further comprising a fixed plate mechanically coupled to the interface side of the holder to protect the holder from wear during scanning across component surfaces.

11. A transducer holder for holding a plurality of transducers for scanning bonds of composite parts, comprising:
   a plurality of slots through the transducer holder adapted for holding the plurality of transducers, respectively;
   a plurality of springs adapted for inserting into the plurality of slots, respectively, for providing a compressive force to each of the respective plurality of transducers; and
   the transducer holder having a material hardness adapted for enabling flexing of the transducer holder while scanning curved composite parts such that the plurality of transducers maintains contact with, and conforms to, contours of the composite parts.

12. The transducer holder of claim 11, further comprising at least one fluid channel adapted for delivering a couplant to a probe end of the plurality of transducers such that the couplant is automatically delivered during scanning of composite parts.

13. The transducer holder of claim 12, the at least one fluid channel further comprising:
   an inlet located for receiving couplant;
   a plurality of outlets for delivering couplant; and
   a manifold adapted for dividing couplant from the inlet into the plurality of outlets for delivering couplant to a plurality of locations.

14. The transducer holder of claim 11, wherein the plurality of slots are arranged in an irregular two-dimensional pattern adapted for scanning adjacent to edges and other geometrical features of composite parts.

15. The transducer holder of claim 11, further comprising a pair of opposing notches aligned for receiving a removable plate for retaining the plurality of springs and the plurality of transducers in the respective plurality of slots.

16. The transducer holder of claim 11, the plurality of slots each having an internal threading adapted to receive a bushing for retaining each of the plurality of springs.

17. The transducer holder of claim 11, further comprising a fixed plate mechanically coupled to a probe end of the transducer holder to protect the transducer holder from wear during scanning across surfaces of composite parts, the fixed plate having a plurality of holes adapted for receiving the plurality of transducers.

18. The transducer holder of claim 11, wherein the plurality of transducers provides an improved scanning coverage compared to a single transducer probe.

19. The transducer holder of claim 14, wherein the plurality of transducers includes an array of six transducers, and the irregular two-dimensional pattern includes two misaligned columns and three misaligned rows to accommodate adequate physical support from the holder.

20. The transducer holder of claim 11, wherein the compressive force from each of the plurality of springs provides a contact load of between about 2 to about 18 ounces on a respective one of the plurality of transducers.

* * * * *